United States Patent
Nishimura

(10) Patent No.: US 7,502,084 B2
(45) Date of Patent: Mar. 10, 2009

(54) LIQUID CRYSTAL DEVICE AND ELECTRONIC APPARATUS

(75) Inventor: Joji Nishimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 326 days.

(21) Appl. No.: 11/438,156

(22) Filed: May 22, 2006

(65) Prior Publication Data
US 2006/0268206 A1    Nov. 30, 2006

(30) Foreign Application Priority Data
May 25, 2005   (JP)  ............... 2005-151889
Mar. 20, 2006   (JP)  ............... 2006-076305

(51) Int. Cl.
*G02F 1/1335*    (2006.01)
(52) U.S. Cl. .................. 349/114; 349/129; 349/141
(58) Field of Classification Search ......... 349/113–115, 349/139–152, 123, 129
See application file for complete search history.

(56) References Cited

U.S. PATENT DOCUMENTS

| | | | |
|---|---|---|---|
| 6,650,385 B1 * | 11/2003 | Liu | 349/113 |
| 6,795,155 B2 * | 9/2004 | Ozawa | 349/179 |
| 6,914,656 B2 * | 7/2005 | Sakamoto et al. | 349/141 |
| 7,327,428 B2 | 2/2008 | Yamazaki et al. | |
| 2004/0227891 A1 | 11/2004 | Hirota | |
| 2006/0055861 A1 | 3/2006 | Hirota | |
| 2006/0181665 A1 | 8/2006 | Hirota | |
| 2006/0238675 A1 * | 10/2006 | Zhu et al. | 349/114 |
| 2006/0256268 A1 * | 11/2006 | Jeong et al. | 349/141 |

FOREIGN PATENT DOCUMENTS

| | | |
|---|---|---|
| JP | A 2003-344837 | 12/2003 |
| JP | A-2004-341465 | 12/2004 |
| JP | A-2005-107489 | 4/2005 |
| JP | A 2005-338264 | 12/2005 |
| JP | A-2006-317905 | 11/2006 |

* cited by examiner

*Primary Examiner*—Thoi V Duong
(74) *Attorney, Agent, or Firm*—Oliff and Berridge, PLC

(57) ABSTRACT

A liquid crystal device includes first and second substrates which are arranged to face each other with a liquid crystal layer interposed therebetween, and first and second electrodes which are provided on the first substrate facing the liquid crystal layer. The liquid crystal layer is driven by electric fields generated between the first and second electrodes. A reflective display region for reflective display and a transmissive display region for transmissive display are provided in each of a plurality of subpixel regions. A main direction of an electric field generated between the first and second electrodes in the transmissive display region is different from a main direction of an electric field between the first and second electrodes in the reflective display region.

9 Claims, 9 Drawing Sheets

TRANSMISSIVE
DISPLAY REGION

REFLECTIVE
DISPLAY REGION

TRANSMISSIVE DISPLAY REGION

REFLECTIVE DISPLAY REGION

LIQUID CRYSTAL DEVICE AND ELECTRONIC APPARATUS

BACKGROUND

1. Technical Field

The present invention relates to a liquid crystal device and an electronic apparatus.

2. Related Art

Examples of known liquid crystal devices include transverse electric field mode liquid crystal devices which can control the alignment of liquid crystal molecules by applying an electric field along the surface of a substrate to a liquid crystal layer. Further, IPS (In-Plane Switching) mode and FFS (Fringe-Field Switching) mode liquid crystal devices with different configurations of the electrodes which generate the electric field are known. In recent years, in order to realize a wide viewing angle by means of a transverse electric field system, a transflective liquid crystal device to which the transverse electric field system is applied has been suggested (for example, see JP-A-2003-344837).

The liquid crystal device disclosed in JP-A-2003-344837 is a multi-gap-type liquid crystal device in which a liquid-crystal-layer thickness in a reflective display region and a liquid-crystal-layer thickness in a transmissive display region are made different from each other. In this case, the transverse electric field system is applied to only the transmissive display region or both the transmissive display region and the reflective display region. In a transflective liquid crystal device, the number of times display light passes through the liquid crystal layer differs in the transmissive display region and the reflective display region. Accordingly, it is necessary to adjust the retardation of the liquid crystal layer in both regions in order to obtain appropriate display. With the application of the multi-gap structure, it is possible to easily adjust the retardation of the liquid crystal layer by a simple process. However, in the transverse electric field mode liquid crystal device, as the liquid-crystal-layer thickness changes, a threshold voltage (driving voltage) changes. Accordingly, it is difficult to obtain favorable display for both reflective display and transmissive display even when the multi-gap structure is applied.

SUMMARY

An advantage of some aspects of the invention is that it provides a liquid crystal device which can perform display with high image quality and wide viewing angle for reflective display and transmissive display and can be manufactured by a simple process, in particular a transflective liquid crystal device.

According to a first aspect of the invention, a liquid crystal device includes first and second substrates which are arranged to face each other with a liquid crystal layer interposed therebetween, and first and second electrodes which are provided on the first substrate facing the liquid crystal layer. The liquid crystal layer is driven by electric fields generated between the first and second electrodes. A reflective display region for reflective display and a transmissive display region for transmissive display are provided in each of a plurality of subpixel regions. A main direction of an electric field generated between the first and second electrodes in the transmissive display region is different from a main direction of an electric field between the first and second electrodes in the reflective display region.

In such a manner, when the electric field in the transmissive display region and the electric field in the reflective display region are formed to have different directions from each other, the alignment state of liquid crystal in the transmissive display region when a voltage is applied and the alignment state of liquid crystal in the reflective display region when a voltage is applied can be made different. With this configuration, a phase difference applied to transmitted light by the liquid crystal layer can be different in the transmissive display region and the reflective display region. Accordingly, a difference in polarization state of display light due to an optical path difference can be eliminated, without changing a liquid-crystal-layer thickness. Therefore, according to the first aspect of the invention, it is possible to obtain favorable display for both transmissive display and reflective display without using a multi-gap structure, and to obtain display with high image-quality and wide viewing angle. Further, a transflective liquid crystal device can be manufactured by a simple process at low cost.

In this specification, for example, a color liquid crystal display device has a configuration in which three subpixels of R (red), G (green), and B (blue) form one pixel. A display region, which is a minimum unit of display, is referred to as 'subpixel region'. Further, the 'reflective display region', which is provided in the subpixel region, represents a region where display is performed using light being incident from a display surface side of the liquid crystal display device. In addition, the 'reflective display region', represents a region where display is performed using light being incident from a rear surface side (opposite to the display surface) of the liquid crystal display device.

According to a second aspect of the invention, a liquid crystal device includes first and second substrates which are arranged to face each other with a liquid crystal layer interposed therebetween, and first and second electrodes which are provided on the first substrate facing the liquid crystal layer. The liquid crystal layer is driven by electric fields generated between the first and second electrodes. A reflective display region for reflective display and a transmissive display region for transmissive display are provided in each of a plurality of subpixel regions. Initial alignment states of liquid crystal molecules in the liquid crystal layer are uniform in the subpixel region. A maximum rotation angle of the liquid crystal molecules by the electric fields generated between the first and second electrodes is different between the transmissive display region and the reflective display region.

With this configuration, a phase difference to be applied to light passing through the liquid crystal layer in the transmissive display region can be different from a phase difference applied to light passing through the liquid crystal layer in the reflective display region. Accordingly, a difference in polarization state of display light for transmissive display and reflective display can be eliminated. As a result, it is possible to implement a liquid crystal device which enables favorable display for both transmissive display and reflective display, without using a multi-gap structure.

In the liquid crystal device according to the second aspect of the invention, the maximum rotation angle in the transmissive display region may be larger than the maximum rotation angle in the reflective display region. In reflective display, light which passes through the liquid crystal layer twice is used as display light, and thus the phase difference applied to transmitted light by the liquid crystal layer becomes larger. Accordingly, like this configuration, when the maximum rotation angle of the liquid crystal molecules in the reflective display region is regulated to be smaller than the maximum rotation angle in the transmissive display region, a difference from the polarization state of display light for transmissive display can be easily made small. Further, it is not necessary to suppress the maximum rotation angle in the transmissive display region, and thus favorable contrast for transmissive display can be easily obtained.

In the liquid crystal device according to the first aspect of the invention, each of the first and second electrodes may have one or more strip electrodes, and the one or more strip electrodes of the first electrode and the one or more strip electrodes of the second electrode may be substantially arranged in parallel with each other in each of the transmissive display region and the reflective display region. That is, the liquid crystal device according to the first aspect of the invention can use an electrode configuration of an IPS (In-Plane Switching) mode.

In the liquid crystal device according to the first aspect of the invention, the first electrode may have a plurality of strip electrodes, and is formed on the second electrode having a flat, substantially uniform shape through an insulating film, and the plurality of strip electrodes may be substantially arranged in parallel with one another in each of the transmissive display region and the reflective display region. That is, the liquid crystal device according to the first aspect of the invention can use an electrode configuration of an FFS (Fringe Field Switching) mode. In a transflective liquid crystal device, a reflecting layer needs to be provided in the subpixel region. However, in an IPS-mode liquid crystal device, if the reflecting layer is provided on the substrate on which the first and second electrodes are provided, the distortion may occur in an electric field generated between the first and second electrodes due to the reflecting layer which is typically formed of a metal film. In contrast, in the FFS mode, since the second electrode is a uniform conductive film, the electric field is not influenced even when the reflecting layer is provided on the substrate on which the first and second electrodes are provided. Therefore, in case of the FFS mode, the substrate, on which the first and second electrodes are provided, can be arranged on the rear surface side (opposite to the display surface) of the liquid crystal device. Further, visibility can be favorably prevented from being degraded due to reflection of external light by metal wiring lines connected to the first and second electrodes. As a result, a liquid crystal device which has excellent visibility can be obtained by a simple configuration.

In the liquid crystal device according to the first aspect of the invention, an extension direction of the strip electrodes in the transmissive display region and an extension direction of the strip electrodes in the reflective display region may be different from each other. According to this configuration, the direction of the electric field in the transmissive display region and the direction of the electric field in the reflective display region can be easily made different. Further, since this configuration may be realized by only the electrode shape, a liquid crystal device can be manufactured by a simple process at low cost.

In the liquid crystal device according to the first aspect of the invention, the strip electrodes may have bent shapes in plan view in a planar region of the transmissive display region or the reflective display region and are arranged in parallel with one another, and the bent portions of the strip electrodes may be arranged along the initial alignment direction of the liquid crystal layer in the transmissive display region or the reflective display region. With the electrode configuration in which the strip electrodes having the bent shaped in plan view are arranged in parallel with one another, a plurality of liquid crystal domains can be easily formed in the subpixel region. Therefore, display coloring when a viewing angle with respect to the liquid crystal device is changed can be effectively prevented.

In the liquid crystal device according to the first aspect of the invention, the strip electrodes having the bent shapes in plan view may be provided in the transmissive display region, and the strip electrodes having substantially linear shapes may be provided in the reflective display region. If the strip electrodes have the bent shapes, display coloring can be eliminated, but the electrode shape is complex and the aperture ratio of the subpixel is rarely ensured. Further, display coloring is conspicuous in transmissive display, but is rarely conspicuous in reflective display. Therefore, if the strip electrodes having the bent shapes are provided only in the transmissive display region, display quality can be improved and display brightness can be ensured.

According to a third aspect of the invention, an electronic apparatus includes the liquid crystal device described above. According to this configuration, an electronic apparatus including a transflective display unit which can perform favorable display for both reflective display and transmissive display can be provided at low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
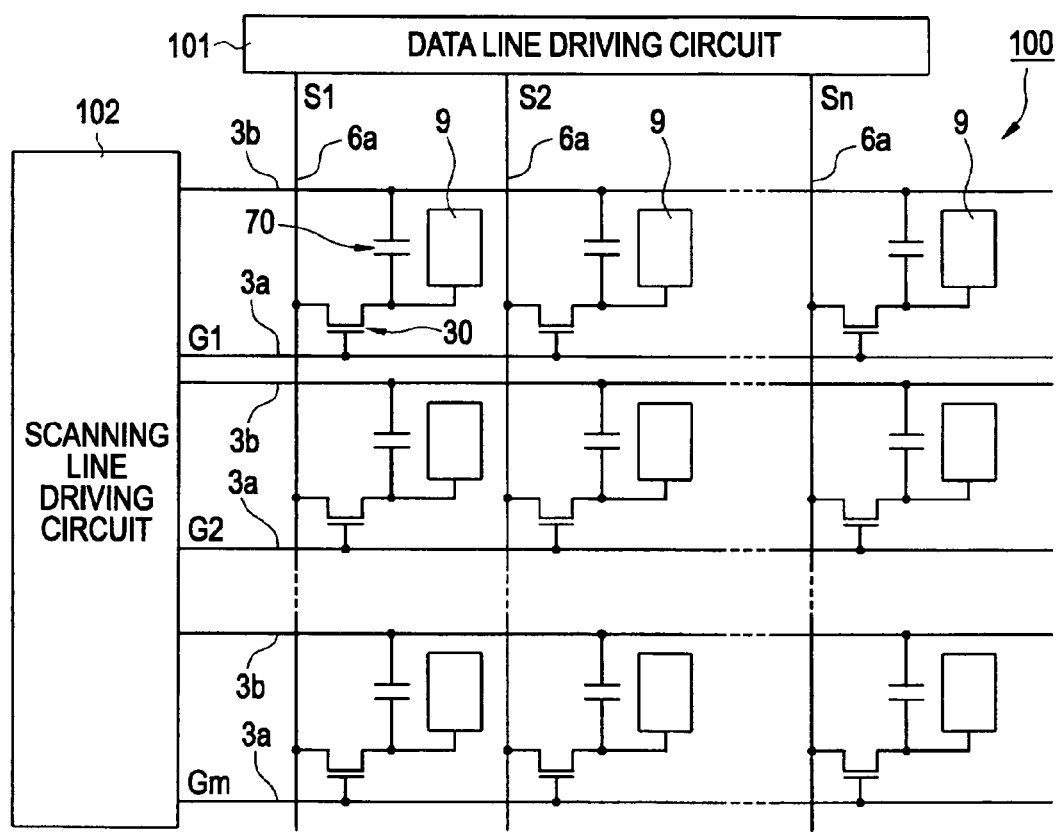
FIG. 1 is a structural circuit diagram of a liquid crystal device according to a first embodiment of the invention.

Hereinafter, a liquid crystal device according to a first embodiment of the invention will be described with reference to the drawings. The liquid crystal device of this embodiment is a transverse electric field mode liquid crystal device which performs image display by applying an electric field (transverse electric field) along a surface of a substrate to a liquid crystal layer and performing alignment control, in particular, an IPS (In-Plane Switching) mode liquid crystal device.

The scale of each layer or member has been adjusted in order to have a recognizable size in the drawings related to the embodiments.

The liquid crystal device of this embodiment is a color liquid crystal device having color filters on the substrate, and one pixel includes three subpixels which output color light components of R (red), G (green), and B (blue), respectively. Therefore, a display region, which is a minimum unit of display, is referred to as 'subpixel region'. Further, a display region having a set of subpixels (R, G, and B) is referred to as 'pixel region'.

Figure 2A:
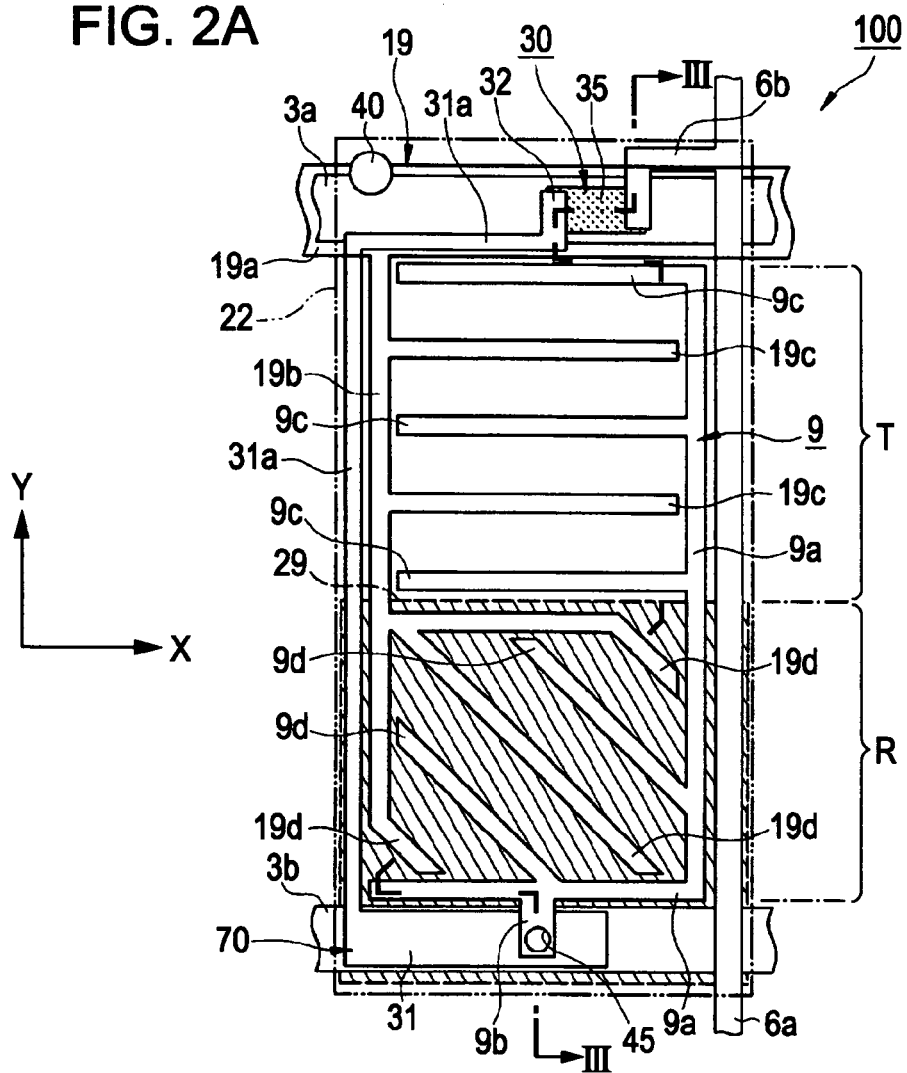
FIG. 2A is a structural plan view showing a subpixel region in the liquid crystal device according to the first embodiment of the invention.
Figure 2B:
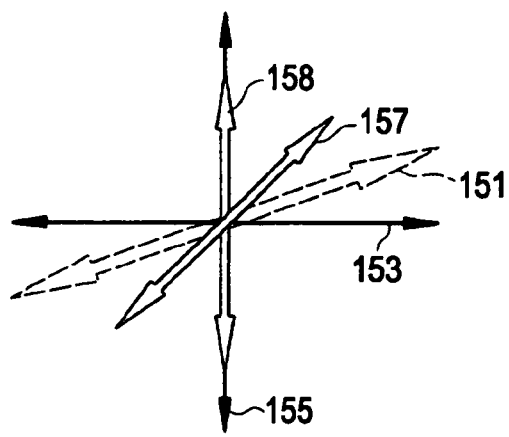
FIG. 2B is an explanatory view illustrating the arrangement relationship of optical axes of optical elements constituting the liquid crystal device.
Figure 3:
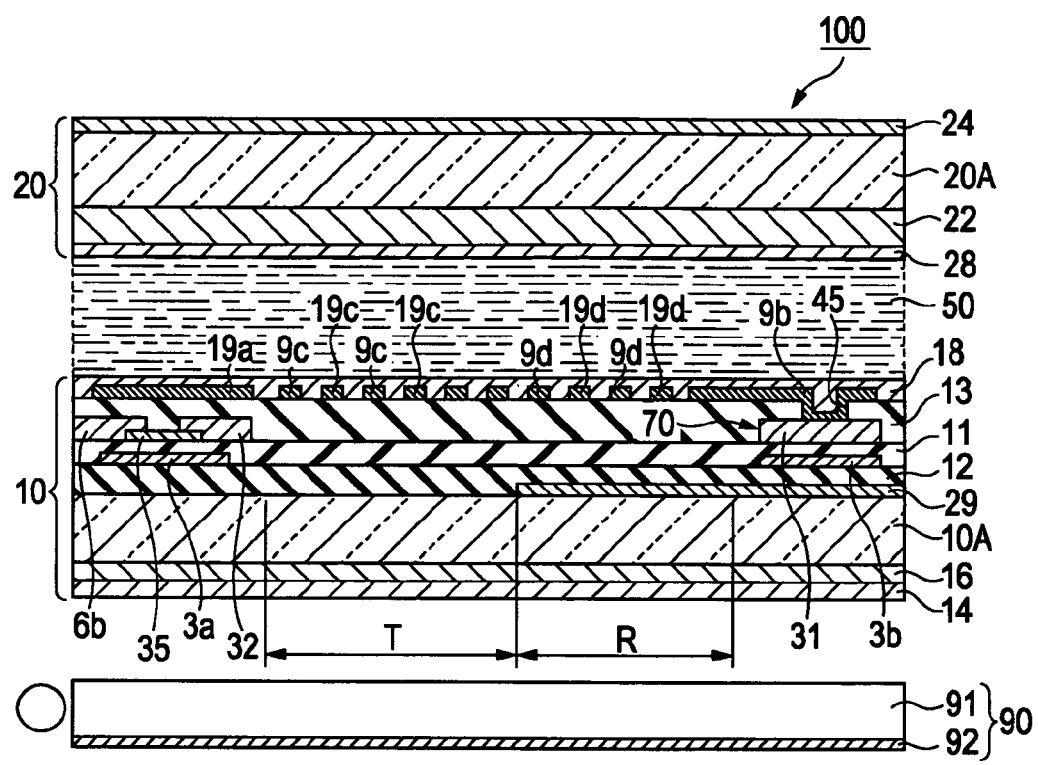
FIG. 3 is a structural cross-sectional view taken along the line III-III of FIG. 2A.

FIG. 1 is a structural circuit diagram of a plurality of subpixel regions formed in a matrix shape constituting the liquid crystal device of this embodiment. FIG. 2A is a structural plan view of a certain subpixel region of the liquid crystal device 100, and FIG. 2B is an explanatory view showing the arrangement relationship of optical elements constituting the liquid crystal device 100 with respect to an optical axis. FIG. 3 is a partial structural cross-sectional view taken along the line III-III of FIG. 2A.

As shown in FIG. 1, in each of a plurality of subpixel regions formed in a matrix shape constituting an image display region of the liquid crystal device 100, a pixel electrode 9 and a TFT 30 for switching control of the pixel electrode 9 are formed. A data line 6a extending from a data line driving circuit 101 is electrically connected to a source of the TFT 30. The data line driving circuit 101 correspondingly supplies image signals S1, S2, . . . , and Sn to the pixels through the data lines 6a. The image signals S1 to Sn may be linear-sequentially supplied in that order or may be individually supplied to a plurality of adjacent data lines 6a.

A scanning line 3a extending from a scanning line driving circuit 102 is electrically connected to a gate of the TFT 30. Scanning signals G1, G2, . . . , and Gm, which are correspondingly supplied from the scanning line driving circuit 102 to the scanning lines 3a in a pulsed manner with a predetermined timing, are linear-sequentially applied to the gates of the TFTs 30 in that order. The pixel electrode 9 is electrically connected to a drain of the TFT 30. The TFTs 30 serving as switching elements are individually put in the ON state for predetermined periods by the input of the scanning signals G1, G2, . . . , and Gm, and then the image signals S1, S2, . . . , and Sn, which are supplied from the data lines 6a, are supplied to the pixel electrodes 9 with a predetermined timing.

The image signals S1, S2, . . . , and Sn having predetermined levels supplied to liquid crystal through the pixel electrodes 9 are held for a predetermined period between the pixel electrodes 9 and common electrodes with the liquid crystal interposed therebetween. Here, in order to prevent leakage of the held image signals, a storage capacitor 70 is added in parallel with a liquid crystal capacitor which is formed between the pixel electrode 9 and the common electrode. The storage capacitor 70 is provided between the drain of the TFT 30 and a capacitor line 3b.

Next, the configuration of the liquid crystal device 100 will be described in detail with reference to FIGS. 2A, 2B, and 3. First, as shown in FIG. 3, the liquid crystal device 100 includes a TFT array substrate (first substrate) 10 and a counter substrate (second substrate) 20 with a liquid crystal layer 50 interposed therebetween. The liquid crystal layer 50 is sealed between the substrates 10 and 20 by a sealant (not shown) which is provided along an opposing edge of the TFT array substrate 10 or the counter substrate 20. On the rear surface of the counter substrate 20 (the bottom surface in the drawing), a backlight (illumination device) 90 having a light-guiding plate 91 and a reflecting plate 92 is provided.

As shown in FIG. 2A, in the subpixel region of the liquid crystal device 100, the data line 6a extending in a Y-axis direction, and the scanning line 3a and the capacitor line 3b extending in an X-axis direction are substantially wired in a lattice shape in plan view. In a region which has a rectangular shape in plan view and is defined by the data line 6a, the scanning line 3a, and the capacitor line 3b, the pixel electrode (first electrode) 9 which has a comb shape in plan view and extends in the Y-axis direction, and a common electrode (second electrode) 19 which has a comb shape in plan view so as to mesh with the pixel electrode 9 and extends in the Y-axis direction are formed. At a corner on an upper left side of the subpixel region in the drawing, a columnar spacer 40 is provided upright so as to separate the TFT array substrate 10 from the counter substrate 20 by a predetermined gap, thereby maintaining the liquid-crystal-layer thickness (cell gap) uniformly.

In the subpixel region, a color filter 22 having the same planar shape as the subpixel region is provided. Further, a reflecting layer 29 is provided to occupy a lower half planar region of the extension region of the pixel electrode 9 and the common electrode 19 (a −Y side region of regions bisected in the Y-axis direction). The reflecting layer 29 is formed by patterning a reflective metal film such as aluminum or silver. As shown in FIG. 2A, among the planar region defined by the pixel electrode 9 and the common electrode 19, a planar region overlapping the reflecting layer 29 in plan view is the reflective display region R of the subpixel region, and the remaining region is the transmissive display region T. The reflecting layer 29 preferably has concavo-convex shapes formed in its surface so as to enable optical scattering. With this configuration, visibility of reflective display can be improved.

The pixel electrode 9 has a substantially L-shaped base end portion 9a which extends along the data line 6a and the capacitor line 3b, a plurality (three in the drawing) of strip electrodes 9c which extend in the −x direction from the base end portion 9a, a plurality of strip electrodes 9d which extend in an oblique direction (−X/+Y direction), and a contact portion 9b which extends from the base end portion 9a in the vicinity of the capacitor line 3b toward the −Y side. The pixel electrode 9 is an electrode member which is formed by patterning a transparent conductive material such as ITO (Indium-Tin-Oxide).

The common electrode 19 has a main line portion 19a which is formed at a position overlapping the scanning line 3a in plan view and extends in the X-axis direction, a base end portion 19b which extends in the Y-axis direction from the main line portion 19a along a side of the subpixel region, and two strip electrodes 19c and three strip electrodes 19d which extend from the base end portion 19b toward a +x side. The two strip electrodes 19c and the strip electrodes 9c of the pixel electrode 9 are alternately arranged. The two strip electrodes extend in parallel with the strip electrodes 9c. Meanwhile, the three strip electrodes 19d and the strip electrodes 9d extending in the oblique direction in the drawing are alternately disposed. The three strip electrodes 19d extend in parallel with the strip electrodes 9d. The common electrode 19 is also formed of a transparent conductive material such as ITO and so on.

The pixel electrode 9 and the common electrode 19 may be formed of a metal material such as chromium and so on, in addition to the transparent conductive material.

As shown in FIG. 2A, in the subpixel region of the liquid crystal device according to this embodiment, the extension directions of the strip electrodes 9c, 9d, 19c, and 19d constituting the pixel electrode 9 and the common electrode 19 are made different in the reflective display region R and the transmissive display region T. That is, the strip electrodes 9c and 19c arranged in the transmissive display region T are formed to extend in parallel along the X-axis direction, and the strip electrodes 9d and 19d arranged in the reflective display region R are formed to extend in a direction (the oblique direction) intersecting the strip electrodes 9c and 19c.

In the subpixel region shown in FIG. 2A, a voltage is applied between the five strip electrodes 9c and 9d extending in the X-axis direction and the five strip electrodes 19c and 19d arranged between the strip electrodes 9c and 9d, and then the liquid crystal is driven by an electric field (transverse electric field) along an XY-plane direction (along the surface of the substrate) generated accordingly. In addition, the pixel electrode 9 and the common electrode 19 are formed in the above-described manner. Accordingly, the electric field is formed to have different directions in the transmissive display region T and the reflective display region R when a voltage is applied.

The TFT 30 is provided in the vicinity of an intersection between the data line 6a extending in the x-axis direction and the scanning line 3a extending in the Y-axis direction. The TFT 30 has a semiconductor layer 35 formed of an island-shaped amorphous silicon film which is partially formed in the planar region of the scanning line 3a, and source and drain electrodes 6b and 32 which are formed to partially overlap the semiconductor layer 35 in plan view. The scanning line 3a serves as a gate electrode of the TFT 30 at a position which overlaps the semiconductor layer 35 in plan view.

The source electrode 6b of the TFT 30 is a wiring line which has a reverse L shape in plan view and extends from the data line 6a to the semiconductor layer 35. The drain electrode 32 is electrically connected to a connection wiring line 31a which extends along a side of the subpixel region at an end on the −Y side, and also electrically connected to a capacitor electrode 31 formed at an opposing edge of the subpixel region through the connection wiring line 31a. The capacitor electrode 31 is a conductive member which is formed to overlap the capacitor line 3b in plan view and which substantially has a rectangular shape in plan view. The contact portion 9b of the pixel electrode 9 is disposed to overlap the capacitor electrode 31 in plan view. The capacitor electrode 31 and the pixel electrode 9 are electrically connected through a pixel contact hole 45 formed at that position. Further, in a region where the capacitor electrode 31 and the capacitor line 3b overlap in plan view, a storage capacitor 70 having the capacitor electrode 31 and the capacitor line 3b as the electrodes is formed.

Referring to the sectional structure shown in FIG. 3, the liquid crystal layer 50 is interposed between the TFT array substrate 10 and the counter substrate 20 which are arranged to face each other. On the outer surface of the TFT array substrate 10 (a side opposite to the liquid crystal layer 50), a retardation film 16 and a polarizing plate 14 are sequentially laminated. On the outer surface of the counter substrate 20, a polarizing plate 24 is provided. The retardation film 16 is a λ/2 retardation film which applies an approximately half-wave phase difference to transmitted light. With the retardation film 16, display characteristics of reflective display and transmissive display can be arranged to be normally black. Therefore, wide viewing angle characteristics can be obtained, without using a special device structure or signal processing configuration.

The TFT array substrate 10 has a light-transmissive substrate main body 10A such as glass, quartz, or plastic as a base. On the inner surface of the substrate main body 10A (facing the liquid crystal layer 50), the reflecting layer 29 formed of a metal film such as aluminum or silver is partially formed in the subpixel region. A first interlayer insulating film 12 formed of a transparent insulating material such as silicon oxide is formed to cover the reflecting layer 29. On the first interlayer insulating film 12, the scanning line 3a and the capacitor line 3b are formed. A gate insulating film 11 formed of a transparent insulating material such as silicon oxide is formed to cover the scanning line 3a and the capacitor line 3b.

On the gate insulating film 11, the semiconductor layer 35 formed of amorphous silicon is formed. The source electrode 6b and the drain electrode 32 are formed to partially run onto the semiconductor layer 35. The capacitor electrode 31 is formed at a position facing the capacitor line 3b in the same layer of the source electrode 6b and the drain electrode 32. As shown in FIG. 2A, the drain electrode 32 is formed integrally with the connection wiring line 31a and the capacitor electrode 31. The semiconductor layer 35 faces the scanning line 3a through the gate insulating film 11. In the opposing region, the scanning line 3a functions as the gate electrode of the TFT 30. The capacitor electrode 31 and the capacitor line 3b facing the capacitor electrode 31 form the storage capacitor 70 with the gate insulating film 11 as a dielectric film.

A second interlayer insulating film 13 formed of silicon oxide or the like is formed to cover the semiconductor layer 35, the source electrode 6b, the drain electrode 32, and the capacitor electrode 31. On the second interlayer insulating film 13, the pixel electrode 9 and the common electrode 19 formed of transparent conductive materials such as ITO and so on are formed. The pixel contact hole 45 is formed so as to pass through the second interlayer insulating film 13 and reach the capacitor electrode 31, and the contact portion 9b of the pixel electrode 9 is partially buried in the pixel contact hole 45. Then, the pixel electrode 9 and the capacitor electrode 31 are electrically connected. In the transmissive display region T and the reflective display region R, the strip electrodes 9c and 9d and the strip electrodes 19c and 19d are alternately arranged. Further, the main line portion 19a of the common electrode 19 is formed at a position facing the semiconductor layer 35, the source electrode 6b, and the drain electrode 32 through the second interlayer insulating film 13.

An alignment film 18 formed of polyimide and so on is formed to cover the pixel electrode 9 and the common electrode 19.

In the meantime, on the inner surface of the counter substrate 20 (facing the liquid crystal layer 50), the color filter 22 is provided. On the color filter 22, an alignment film 28 formed of polyimide and so on is laminated. The color filter 22 is preferably divided into two regions having different degrees of color within the subpixel region. As a specific example, a first color material region can be provided to correspond to the planar region of the transmissive display region T, and a second color material region can be provided to correspond to the planar region of the reflective display region R. Further, the degree of color of the first color material region can be larger than the degree of color of the second color material region. With this configuration, a difference in degree of color of display light between the transmissive display region T where display light passes through the color filter 22 only once and the reflective display region R where display light passes through the color filter 22 twice can be prevented. Therefore, display quality can be improved by arranging the appearance of reflective display and transmissive display.

On the color filter 22, a planarizing film formed of a transparent resin material an so on is preferably laminated. With the planarizing film, the surface of the counter substrate 20 is planarized, which makes it possible to uniformize the thickness of the liquid crystal layer 50. Therefore, contrast can be prevented from being degraded due to nonuniformity of a driving voltage in the subpixel region.

The arrangement of each optical axis in the liquid crystal device of this embodiment is as shown in FIG. 2B. A transmission axis 153 of the polarizing plate 14 on the TFT array substrate 10 is arranged in parallel in the X-axis direction, and a transmission axis 155 of the polarizing plate 24 on the counter substrate 20 is arranged in a direction perpendicular to the transmission axis 153 of the polarizing plate 14 (the Y-axis direction). The alignment films 18 and 28 are aligned uniformly through a rubbing treatment in the same direction in plan view and define an alignment direction of liquid crystal molecules of the liquid crystal layer in an initial alignment state (when the electric field is not generated between the electrodes). This direction is a rubbing direction 151 shown in FIG. 2B. In this embodiment, the rubbing direction 151 has an angle of about 20° with respect to the X-axis direction. As the rubbing direction 151, a certain direction may be selected, and a direction intersecting the main direction of the transverse electric field generated between the pixel electrode 9 and the common electrode 19, that is, a direction not matching with the main direction of the transverse electric field, is preferably selected. In this embodiment, a transverse electric field direction 158 in the transmissive display region T is parallel to the Y-axis direction, and a transverse electric field direction 157 in the reflective display region R lies halfway between the transverse electric field direction 158 of the transmissive display region and the rubbing direction 151.

The relationship between the rubbing direction 151 and the transverse electric field directions 157 and 158 can be suitably changed according to the retardation value of the liquid crystal layer 50 or the optical axis arrangement of the polarizing plates 14 and 24, and is not limited to one shown in FIG. 2B. In this embodiment, if an angle of the transverse electric field direction 157 in the reflective display region R and the rubbing direction 151 is in a range of 20° to 60°, an angle of the transverse electric field direction 158 in the transmissive display region T and the rubbing direction 151 is set in a range of 60° to 85°.

The liquid crystal device 100 having the above-described configuration is an IPS-mode liquid crystal device. In this case, the application of the image signal (voltage) to the pixel electrode 9 through the TFT 30 causes the electric field along the surface of the substrate to be generated between the pixel electrode 9 and the common electrode 19 (the X-axis direction of FIG. 2 in plan view). Then, the liquid crystal is driven by the electric field, and transmittance/reflectance of each subpixel is changed, thereby image display is performed.

Figure 4A:
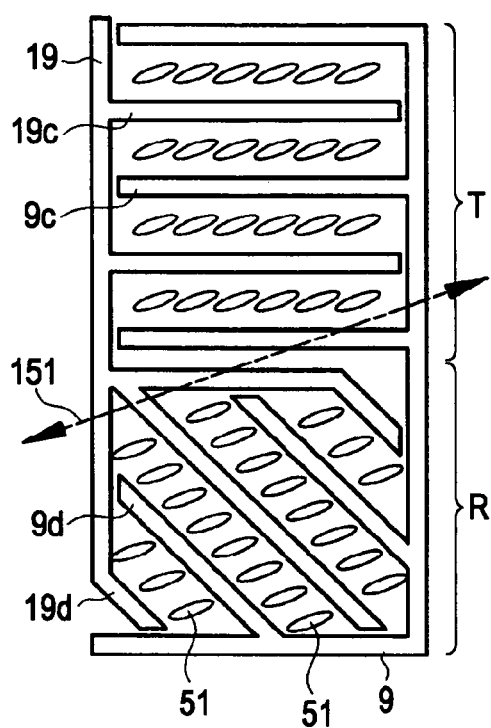
FIG. 4A is an explanatory view illustrating the operation of the liquid crystal device according to the first embodiment of the invention.
Figure 4B:
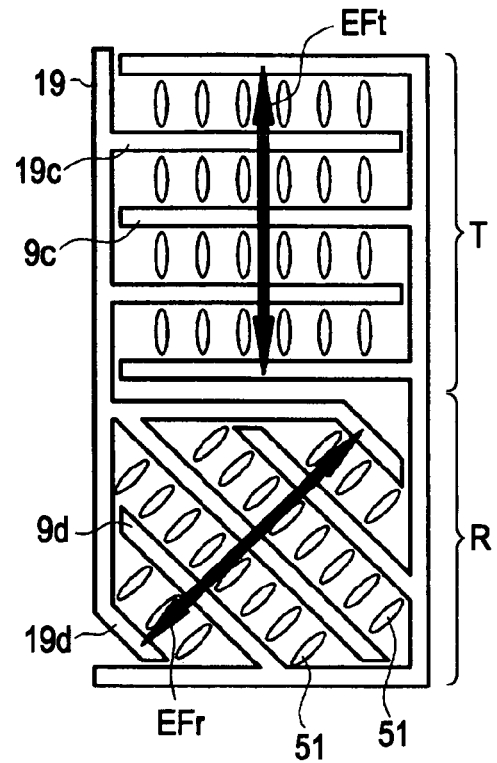
FIG. 4B is an explanatory view illustrating the operation of the liquid crystal device according to the first embodiment of the invention.
Figure 5A:
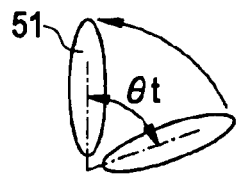
FIG. 5A is an explanatory view illustrating the operation of the liquid crystal device according to the first embodiment of the invention.
Figure 5B:
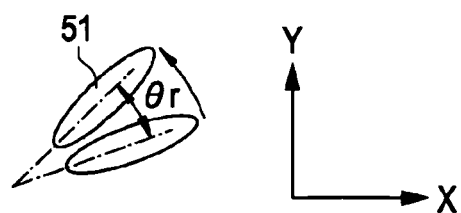
FIG. 5B is an explanatory view illustrating the operation of the liquid crystal device according to the first embodiment of the invention.

FIGS. 4A to 5B are explanatory views illustrating the operation of the liquid crystal device 100 according to this embodiment. FIG. 4A is a schematic plan view of the subpixel region showing the alignment state of liquid crystal molecules 51 in a state where the voltage is not applied to the pixel electrode 9 (non-selection state). FIG. 4B is a schematic plan view of the subpixel region showing the alignment state of liquid crystal molecules 51 in a state where the voltage is applied to the pixel electrode 9 (selection state). Further, FIGS. 5A and 5B are explanatory views showing the operations of the liquid crystal molecules 51 in the transmissive display region T and the reflective display region R, respectively.

As shown in FIG. 4A, in a state where the voltage is not applied to the pixel electrode 9, the liquid crystal molecules 51 constituting the liquid crystal layer 50 are aligned substantially horizontally along the rubbing direction 151 between the substrates 10 and 20. As described above, the alignment films 18 and 28 with the liquid crystal layer 50 interposed therebetween are subjected to the rubbing treatment in the same direction in plan view, and the liquid crystal molecules 51 are aligned horizontally in one direction between the substrates. Then, if the electric field is applied to the liquid crystal layer 50 having such an alignment state through the pixel electrode 9 and the common electrode 19, an electric field EFt along a widthwise direction (Y-axis direction) of the strip electrodes 9c and 19c is applied in the transmissive display region T, and then the liquid crystal molecules 51 are aligned along the Y-axis direction, as shown in FIG. 4B. In the meantime, in the reflective display region R, the extension direction of the strip electrodes 9d and 19d is different from that of the strip electrodes 9c and 19c in the transmissive display region T. Then, an electric field EFr having a different direction from that in the transmissive display region T is formed, and the liquid crystal molecules 51 are aligned along the direction of the electric field EFr. That is, in the transmissive display region T, since the direction of the electric field EFt and the rubbing direction 151 make a relatively large angle, the liquid crystal molecules 51 rotate by a large amount when the voltage is applied, as shown in FIG. 5A. In contrast, in the reflective display region R, since the direction of the electric field EFr and the rubbing direction 151 make a small angle, as compared with the transmissive display region T, the rotation angle of the liquid crystal molecules 51 when the voltage is applied becomes small, as shown in FIG. 5B.

The liquid crystal device 100 performs bright/dark display using birefringence based on a difference in alignment state of the liquid crystal molecules 51. Further, the operation of the liquid crystal molecules 51 when the voltage is applied is different in the transmissive display region T and the reflective display region R, thereby obtaining appropriate transmittance/reflectance in the individual regions.

Figure 6:
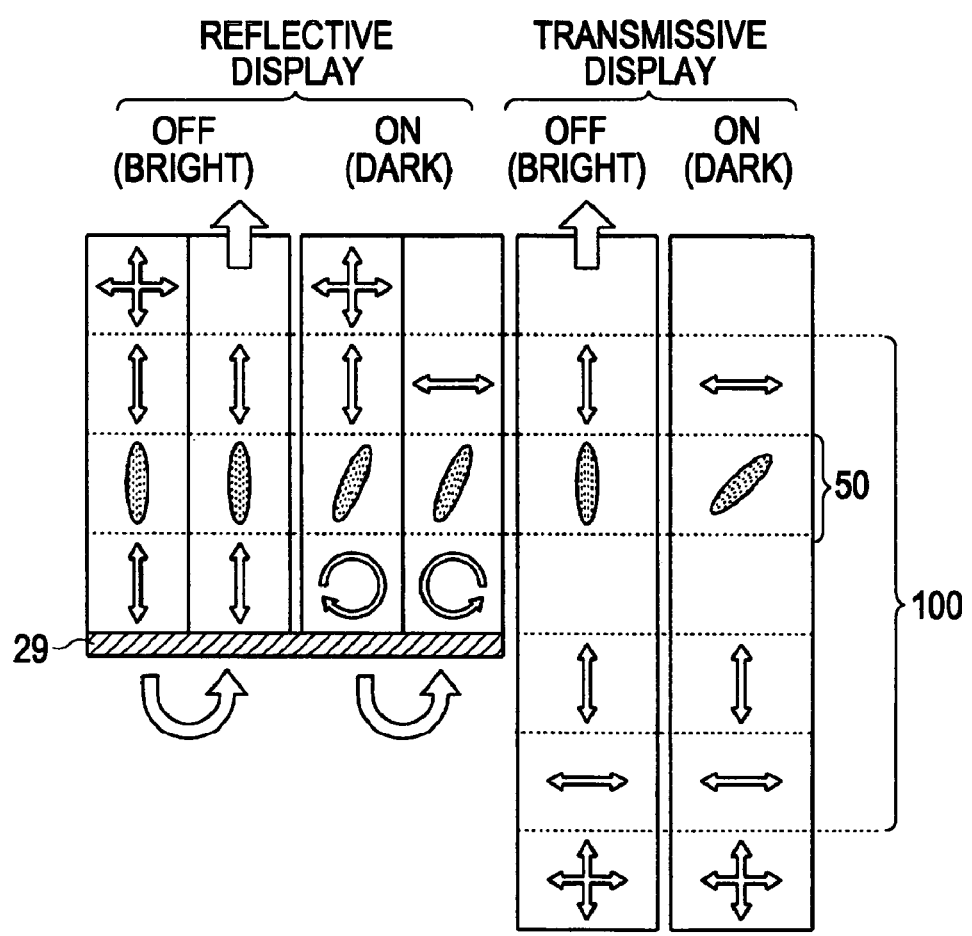
FIG. 6 is an explanatory view illustrating the operation of the liquid crystal device according to the first embodiment of the invention.

Next, the display operation of the liquid crystal device 100 having the above-described configuration will be specifically described with reference to FIG. 6. FIG. 6 is an explanatory view illustrating the operation of the liquid crystal device 100. In FIG. 6, an explanatory view illustrating the operation of reflective display (left side) and an explanatory view illustrating the operation of transmissive display (right side) are shown. Arrows shown in FIG. 6 represent polarization states of light incident on the liquid crystal device 100 and light passing through the liquid crystal device 100 in plan view. As regards the illustration of the arrow, a horizontal direction in FIG. 6 corresponds to the X-axis direction of FIG. 2A and a vertical direction corresponds to the Y-axis direction of FIG. 2A.

First, transmissive display (transmission mode) on the right side of FIG. 6 will be described.

In the liquid crystal device 100, light emitted from the backlight 90 passes through the polarizing plate 14, and is converted into linearly polarized light parallel to the transmission axis 153 of the polarizing plate 14 to be then incident on the retardation film 16. The retardation film 16 is a so-called $\lambda/2$ retardation film which applies the half-wave phase difference to transmitted light. Accordingly, linearly polarized light having passed through the polarizing plate 14 is converted into linearly polarized light perpendicular to the polarizing plate 14 and is emitted from the retardation film 16 to be then incident on the liquid crystal layer 50.

Then, if the liquid crystal layer 50 is in an OFF state (non-selection state), linearly polarized light is emitted from the liquid crystal layer 50 while having the same polarization state as when incident. Linearly polarized light passes through the polarizing plate 24 having the parallel transmission axis 155 to be then viewed as display light, and the subpixel performs bright display.

In the meantime, if the liquid crystal layer 50 is in an ON state (selection state), incident light is given a predetermined phase difference ($\lambda/2$) by the liquid crystal layer 50 and is converted into linearly polarized light which is rotated by 90° from the polarization direction when incident to be then emitted from the liquid crystal layer 50. Linearly polarized light is absorbed by the polarizing plate 24 which has the transmission axis 155 perpendicular to linearly polarized light, and the subpixel performs dark display.

Next, reflective display on the left side of FIG. 6 will be described.

In reflective display, light incident from the upper side (outside) of the polarizing plate 24 passes through the polarizing plate 24 and is converted into linearly polarized light parallel to the transmission axis 155 of the polarizing plate 14 to be then incident on the liquid crystal layer 50. At this time, if the liquid crystal layer 50 is in the OFF state, linearly polarized light is emitted from the liquid crystal layer 50 in the same polarization state and reaches the reflecting layer 29. Then, light reflected by the reflecting layer 29 passes through the liquid crystal layer 50 again and returns to the polarizing plate 24. Linearly polarized light is parallel to the transmission axis 155 of the polarizing plate 24. Accordingly, linearly polarized light passes through the polarizing plate 24 to be then viewed, and the subpixel performs bright display.

In the meantime, if the liquid crystal layer 50 is in the ON state, linearly polarized light incident on the liquid crystal layer 50 is given a predetermined phase difference ($\lambda/4$) by the liquid crystal layer 50 to be then converted into clockwise circularly polarized light and reaches the reflecting layer 29. When clockwise circularly polarized light is reflected by the reflecting layer 29, its rotation direction viewed from the polarizing plate 24 is inverted. Accordingly, light incident on the liquid crystal layer 50 from the reflecting layer 29 turns into counterclockwise circularly polarized light. Subsequently, counterclockwise circularly polarized light is converted into linearly polarized light having a polarization direction perpendicular to the polarization direction when incident by the liquid crystal layer 50 and reaches the polarizing plate 24. Then, linearly polarized light which reaches the polarizing plate 24 is absorbed by the polarizing plate 24 having the transmission axis 155 perpendicular to the polarization direction, and the subpixel performs dark display.

As described above, the liquid crystal device 100 of this embodiment has the pixel electrode 9 and the common electrode 19, and thus the phase difference applied to light passing through the liquid crystal layer 50 in a state where the voltage is applied to the pixel electrode 9 (selection state) can be made different in the transmissive display region T and the reflective display region R. Accordingly, a difference in display quality between transmissive display and reflective display due to an optical path difference between the transmissive display region T and the reflective display region R can be eliminated. Therefore, high-quality display for transmissive display and reflective display can be obtained.

In a transflective liquid crystal device, display light to be emitted from the reflective display region R is light passing through the liquid crystal layer 50 twice, and display light to be emitted from the transmissive display region T is light passing through the liquid crystal layer 50 only once. For this reason, the phase difference applied to transmitted light by the liquid crystal layer 50 in the reflective display region is about twice as large as the phase difference applied in the transmissive display region T. Accordingly, a difference in transmittance/reflectance between transmissive display and reflective display may be larger, and display quality may be degraded. As a countermeasure against this problem, a multi-gap structure has been used in which the liquid-crystal-layer thickness is different in the transmissive display region and the reflective display region.

However, in a transverse electric field mode liquid crystal device, the driving voltage is significantly changed by the liquid-crystal-layer thickness. Accordingly, even when the multi-gap structure is applied, degradation of display quality due to a difference in driving voltage between the reflective display region and the transmissive display region cannot be avoided, and thus it is difficult to obtain high-quality transflective display.

In contrast, the liquid crystal device 100 of this embodiment uses the above-described configuration for the pixel electrode 9 and the common electrode 19 in the subpixel region, thereby obtaining reflective display and transmissive display with high contrast, without using the multi-gap structure. Therefore, it is possible to implement a high-quality transflective liquid crystal device by a simple configuration. In addition, since the multi-gap structure is not required, the liquid crystal device 100 of this embodiment can be easily manufactured by a simple process at low cost.

Further, since the liquid-crystal-layer thickness in the subpixel region is constant, a difference in driving voltage between the transmissive display region T and the reflective display region R does not occur, and there is no case where a display state is not different in reflective display and transmissive display. In addition, when the multi-gap structure is formed in the subpixel region, the liquid-crystal-layer thickness is consecutively changed at a boundary of the regions having different liquid-crystal-layer thicknesses is formed. Accordingly, the alignment of the liquid crystal molecules in the boundary region may be diffused, and light leakage may occur. In the liquid crystal device 100 of this embodiment, however, such a problem does not occur, and high-contrast display can be obtained.

In this embodiment, the extension direction of the strip electrodes 9c, 9d, 19c, and 19d of the pixel electrode 9 and the common electrode 19 is different in the transmissive display region T and the reflective display region R, such that the transverse electric field direction in the transmissive display region T and the transverse electric field direction in the reflective display region R are made different. However, the technical scope of this invention is not limited to such a configuration. Another configuration can be used as long as it exhibits the above-described advantages. For example, instead of making the extension direction of the strip electrodes 9c, 9d, 19c, and 19d different in the transmissive display region T and the reflective display region R, the rubbing direction of each of the alignment films 18 and 28 may be different in the transmissive display region T and the reflective display region R. With this configuration, the initial alignment direction of the liquid crystal molecules can be different in the transmissive display region T and the reflective display region R. Therefore, the orientations of the liquid crystal molecules when the voltage is applied can be made different in the transmissive display region T and the reflective display region R, and thus the same advantages as those in the first embodiment can be obtained.

In the above-described embodiment, a retardation film may be provided on the side of the counter substrate 20 of the reflecting layer 29. With this configuration, a desired phase difference can be applied to only transmitted light in the reflective display region R, and thus a degree of freedom for optical design of the liquid crystal device can be improved.

Second Embodiment

Next, a second embodiment of the invention will be described with reference to FIGS. 7A to 9B.

Figure 7A:
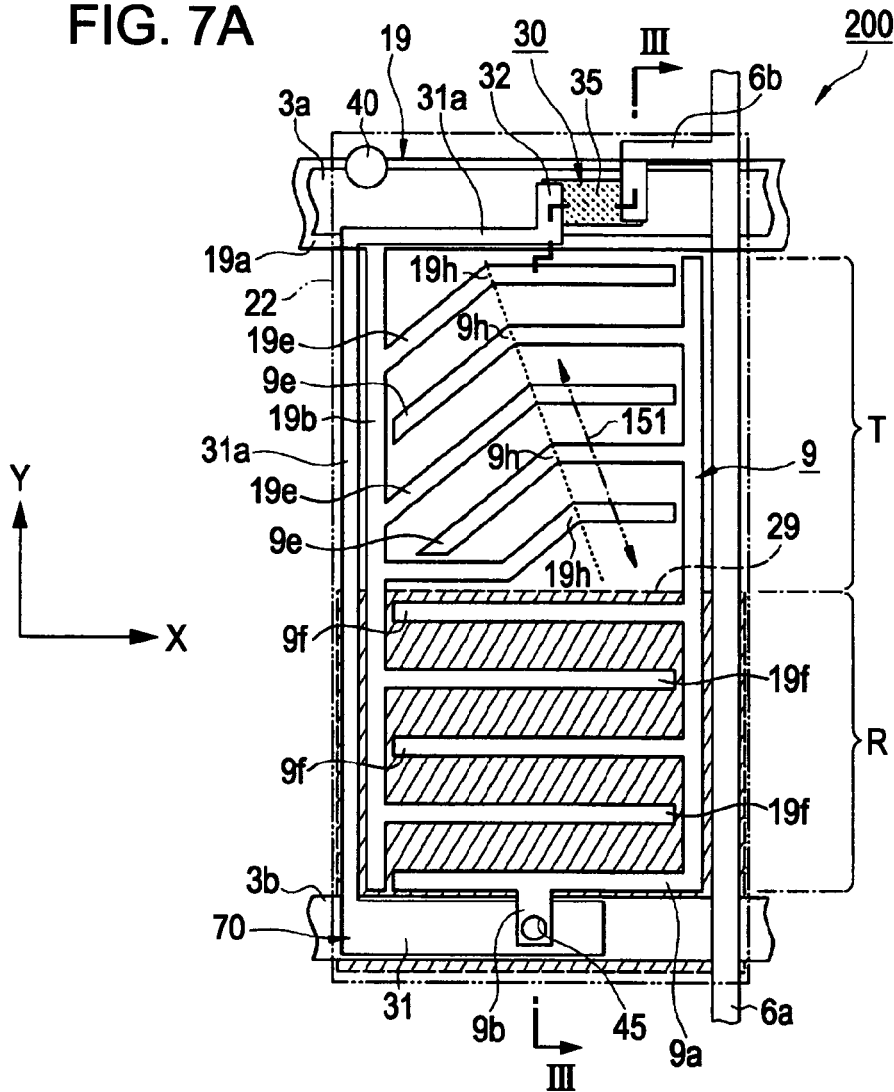
FIG. 7A is a structural plan view showing a subpixel region according to a second embodiment of the invention.
Figure 7B:
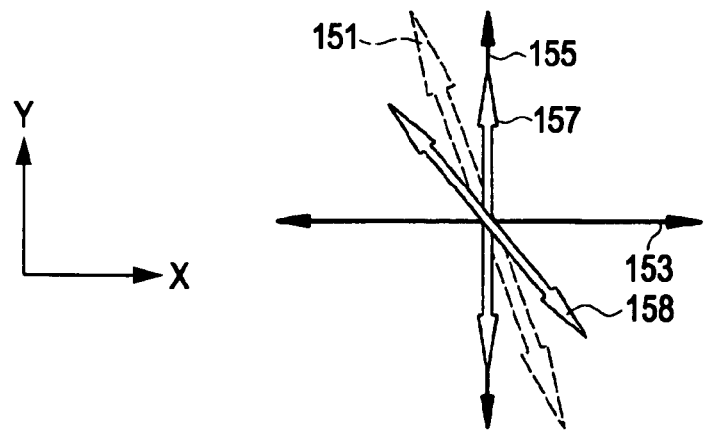
FIG. 7B is an explanatory view illustrating the arrangement of individual optical axes in FIG. 7A.
Figure 8A:
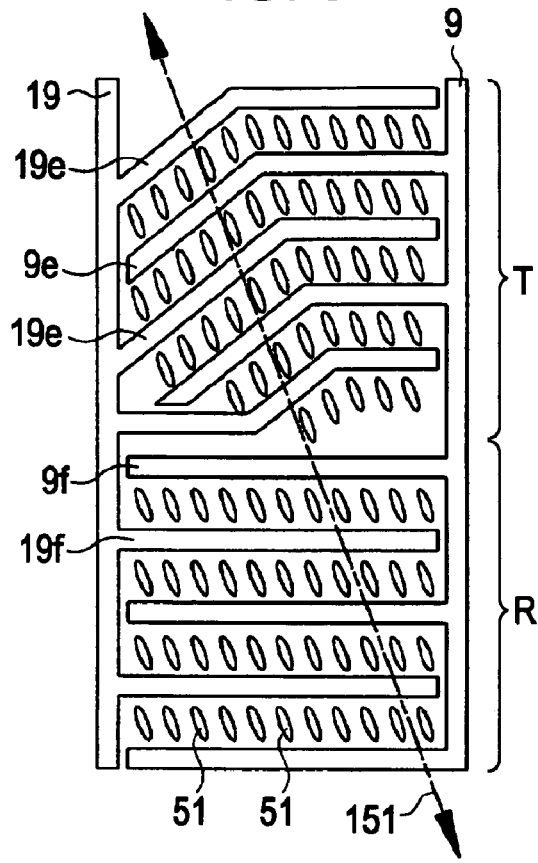
FIG. 8A is an explanatory view illustrating the operation of a liquid crystal device according to the second embodiment of the invention.
Figure 8B:
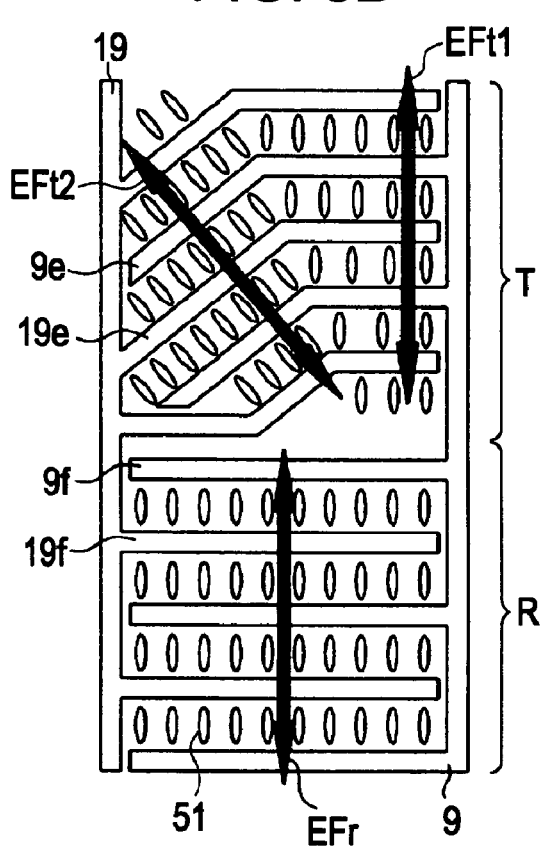
FIG. 8B is an explanatory view illustrating the operation of the liquid crystal device according to the second embodiment of the invention.
Figure 9A:
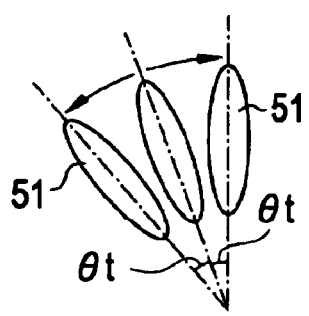
FIG. 9A is an explanatory view illustrating the operation of a liquid crystal device according to the second embodiment of the invention.
Figure 9B:
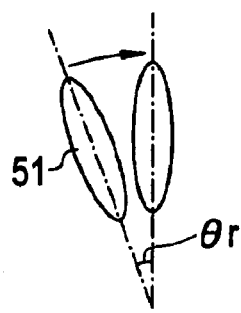
FIG. 9B is an explanatory view illustrating the operation of a liquid crystal device according to the second embodiment of the invention.

FIG. 7A is a structural plan view showing a certain subpixel region of a liquid crystal device 200 according to this embodiment. FIG. 7B is an explanatory view showing the optical axis arrangement in FIG. 7A. FIGS. 8A to 9B are diagram illustrating the operation in the liquid crystal device 200 of this embodiment. FIGS. 8A and 8B are schematic plan views of the subpixel region. FIGS. 9A and 9B are explanatory views showing the orientations of the liquid crystal molecules.

The basic configuration of the liquid crystal device 200 according to this embodiment is the same as that of the first embodiment. FIGS. 7A and 7B correspond to FIGS. 2A and 2B in the first embodiment, respectively, and FIGS. 8A to 9B correspond to FIGS. 4A to 5B in the first embodiment, respectively. Further, the sectional structure taken along the line III-III of FIG. 7A is substantially the same as the sectional structure of the liquid crystal device according to the first embodiment shown in FIG. 3.

Therefore, in FIGS. 7A to 9B, the same parts as those of the liquid crystal device 100 in the first embodiment shown in FIGS. 1 to 6 are represented by the same reference numerals and the descriptions thereof will be omitted.

As shown in FIG. 7A, in the subpixel region of the liquid crystal device 200 according to this embodiment, a pixel electrode (first electrode) 9 and a common electrode (second electrode) 19 are provided. This embodiment is different from the first embodiment in that the pixel electrode 9 has two strip electrodes 9e having bent shapes in plan view and three strip electrodes 9f having linear shapes, and the common electrode 19 has three strip electrodes 19e having bent shapes in plan view and two strip electrodes 19f having linear shapes.

The strip electrodes 9e and 19e having the bent shapes are alternately arranged in parallel with each other in the transmissive display region T. In the meantime, the strip electrodes 9f and 19f having the linear shapes are alternately arranged in parallel with each other in the reflective display region R.

In the strip electrodes 9e and 19e having the bent shapes, the bent portions 9h and 19h are arranged on the same line in a dot region. In addition, lines connecting the bent portions 9h and 19h are parallel to the rubbing direction 151.

Referring to the optical axis arrangement shown in FIG. 7B, the transmission axes 153 and 155 of the polarizing plates 14 and 24 are arranged in parallel in the X-axis and Y-axis directions, respectively. This arrangement is the same as that in the first embodiment. However, the rubbing direction 151 of the alignment film is rotated by about 90° with respect to the rubbing direction shown in FIG. 2B. In addition, the transverse electric field direction 157 of the reflective display region R is parallel to the Y-axis direction. Further, in this embodiment, since all the strip electrodes 9e and 19e arranged in the transmissive display region T have the bent shapes, an electric field (transverse electric field) are formed in two directions in the transmissive display region T when the voltage is applied. Among the two directions of the transverse electric field of the transmissive display region T, one transverse electric field direction 158 is a direction substantially halfway of the X and Y axes. Another transverse electric field direction is a direction which matches with the transverse electric field direction 157 of the reflective display region R.

In the liquid crystal device 200 according to this embodiment having the above-described configuration, when the voltage is not applied to the pixel electrode 9 (non-selection state), as shown in FIG. 8A, the liquid crystal molecules 51 are arranged uniformly along the rubbing direction 151. Then, if the voltage is applied to the pixel electrode 9 and the selection state is active, as shown in FIG. 8B, the transverse electric field depending on the arrangement of the strip electrodes 9e, 9f, 19e, and 19f is generated, and drives the liquid crystal molecules 51. In the transmissive display region T, all the strip electrodes 9e and 19e have the bent shapes. Accordingly, in the same region, an electric field in two directions of transverse electric fields EFt1 and EFt2 is formed, and the liquid crystal molecules 51 are aligned along the transverse electric fields. As a result, two liquid crystal domains are divided and formed in the transmissive display region T. In the meantime, in the reflective display region R, the strip electrodes 9f and 19f have the linear shapes. Accordingly, the transverse electric field EFr is formed in only one direction perpendicular to the extension direction of the strip electrodes 9f and 19f. Then, the liquid crystal molecules 51 are aligned along the transverse electric field EFr.

As such, in the liquid crystal device 200 of this embodiment, the orientations of the liquid crystal molecules 51 when the voltage is applied is different in the transmissive display region T and the reflective display region R. Therefore, the retardation of the liquid crystal layer 50 in the transmissive display region T can be made different from the retardation in the reflective display region R. As a result, like the first embodiment described above, a display difference between reflective display and transmissive display can be eliminated, without using a multi-gap structure, and high-quality display can be obtained.

In this embodiment, the strip electrodes 9e and 19e having the bent shapes are used in the transmissive display region T, the bent portions 9h and 19h of the strip electrodes 9e and 19e are arranged in parallel with the rubbing direction 151. Accordingly, when the voltage is applied to the pixel electrode 9, as shown in FIG. 9A, the liquid crystal molecules 51 of the transmissive display region T are symmetrically rotated and aligned with respect to the initial alignment direction (rubbing direction). Therefore, display coloring when a viewing angle is changed can be prevented, and thus display quality can be improved.

The strip electrodes having the bent shapes can be applied to the reflective display region R. In general, display coloring is conspicuous in transmissive display, but is rarely conspicuous in reflective display. Further, when the strip electrodes have the bent shapes, display coloring can be prevented, but it is difficult to efficiently use a space of the subpixel region and to ensure an aperture ratio. Therefore, like this embodiment, it is desirable to use the bent shape for the strip electrode in the transmissive display region T.

Third Embodiment

Next, a third embodiment of the invention will be described with reference to FIGS. 10A to 11.

Figure 10A:
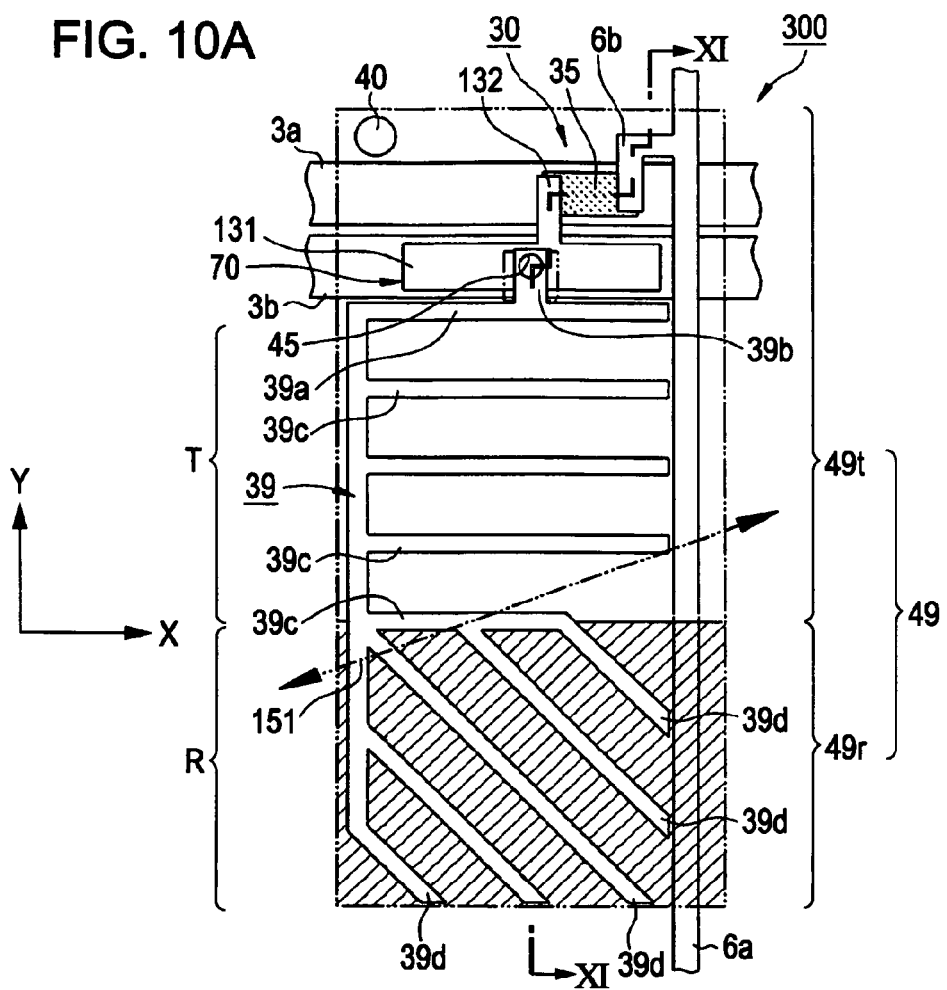
FIG. 10A is a structural plan view showing a subpixel region according to a third embodiment of the invention.
Figure 10B:
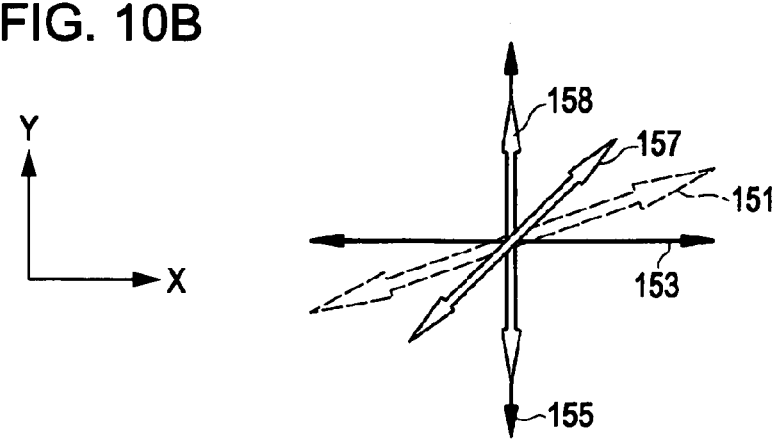
FIG. 10B is an explanatory view illustrating the arrangement of individual optical axes in the liquid crystal device according to the third embodiment of the invention.

FIG. 10A is a structural plan view showing a certain subpixel region of a liquid crystal device 300 according to this embodiment. FIG. 10B is an explanatory view showing the optical axis arrangement of the liquid crystal device according to this embodiment. FIG. 11 is a structural cross-sectional view taken along the line XI-XI of FIG. 10A.

The liquid crystal device 300 of this embodiment is a transverse electric field mode liquid crystal device which performs image display by applying an electric field schematically along the surface of the substrate (transverse electric field) to liquid crystal and performing the alignment control, in particular, an FFS (Fringe Field Switching) mode liquid crystal device. The circuit configuration and the overall configuration of the liquid crystal device 300 of this embodiment is the same as those of the liquid crystal device 100 of the first embodiment. In FIGS. 10A to 11, the same parts as those of the liquid crystal device 100 of the first embodiment shown in FIGS. 1 to 6 are represented by the same reference numerals, and the descriptions thereof will be omitted.

As shown in FIG. 10A, in the subpixel region of the liquid crystal device 300, a pixel electrode (first electrode) 39 which substantially has a comb shape in plan view and extends in the Y-axis direction, and a flat, substantially uniform common electrode (second electrode) 49 is arranged to overlap the pixel electrode 39 in plan view are provided. A data line 6a which extends in the X-axis direction, a scanning line 3a which extends in the Y-axis direction, and a capacitor line 3b which extends in parallel with the scanning line 3a close to the scanning line 3a are formed. At a corner on an upper left side of the subpixel region in FIG. 10A, a columnar spacer 40 is provided upright so as to maintain a TFT array substrate 10 and a counter substrate 20 to be separated by a predetermined gap from each other.

The common electrode 49 is divided into a transparent common electrode 49t and a reflective common electrode 49r in the subpixel region. In the entire image display region, the transparent common electrodes 49t and the reflective common electrodes 49r are alternately arranged in the Y-axis direction. In the subpixel region in the drawing, a region where the reflective common electrode 49r is formed becomes a reflective display region R, and a remaining light-transmissive region (a formation region of the transparent common electrode 49t) becomes a transmissive display region T.

In this embodiment, the transparent common electrode 49t is a conductive film formed of a transparent conductive material such as ITO and so on, and the reflective common electrode 49r is a reflecting layer formed of a light-reflective metal film such as aluminum or silver. Although the common electrode 49 is planarly divided into the transparent common electrode 49t and the reflective common electrode 49r in this embodiment, the transparent common electrode 49t may be formed to cover the reflective common electrode 49r. In this case, the transparent common electrode 49t can be formed in a flat, uniform shape on the TFT array substrate.

The pixel electrode 39 has a base end portion 39a which has a reverse L shape in plan view, four strip electrodes 39c and five strip electrodes 39d which extend in the subpixel region to be electrically connected to the base end portion 39a, and a contact portion 39b. Among the strip electrodes, the four strip electrodes 39c have linear shapes extending in the X-axis direction and are arranged in the transmissive display region T. On the other hand, the five strip electrodes 39d have linear shapes extending in a downward oblique direction in the drawing and are arranged in the reflective display region R. Among the strip electrodes 39d, the two electrodes 39d arranged on the right side in the drawing (+X side) extend from the strip electrode 39c which extends along the boundary portion of the reflective common electrode 49r and the transparent common electrode 49t.

As described above, in the liquid crystal device 300 of this embodiment, the extension direction of the strip electrodes 39c and 39d of the pixel electrode 39 is different in the transmissive display region T and the reflective display region R. Further, when a voltage is applied to the pixel electrode 39 and an electric field substantially along the surface of the substrate (transverse electric field) is generated between the pixel electrode 39 and the common electrode 49, the direction of the transverse electric field in the transmissive display region T and the direction of the transverse electric field in the reflective display region R can be made different from each other.

The TFT 30 is provided in the vicinity of the intersection between the data line 6a and the scanning line 3a. The TFT 30 has a semiconductor layer 35 which is formed of amorphous silicon and is partially formed in the planar region of the scanning line 3a, and a source electrode 6b and a drain electrode 132 which are formed to partially overlap the semiconductor layer 35. The scanning line 3a functions as a gate electrode of the TFT 30 at a position which overlaps the semiconductor layer 35 in plan view.

The source electrode 6b of the TFT 30 is formed to extend from the data line 6a to the semiconductor layer 35 and has an L shape in plan view, and the drain electrode 132 extends toward the −Y side and is electrically connected to a capacitor electrode 131 having an L shape in plan view. On the capacitor electrode 131, the contact portion 39b of the pixel electrode 39 is arranged to extend from the central portion of the subpixel region. The capacitor electrode 131 and the pixel electrode 39 are electrically connected through a pixel contact hole 45 provide at a position where both overlap in plan view. Further, the capacitor electrode 131 is arranged in the planar region of the capacitor line 3b, and a storage capacitor 70 is formed at that position with the capacitor electrode 131 and the capacitor line 3b facing each other in a thicknesswise direction as electrodes.

Figure 11:
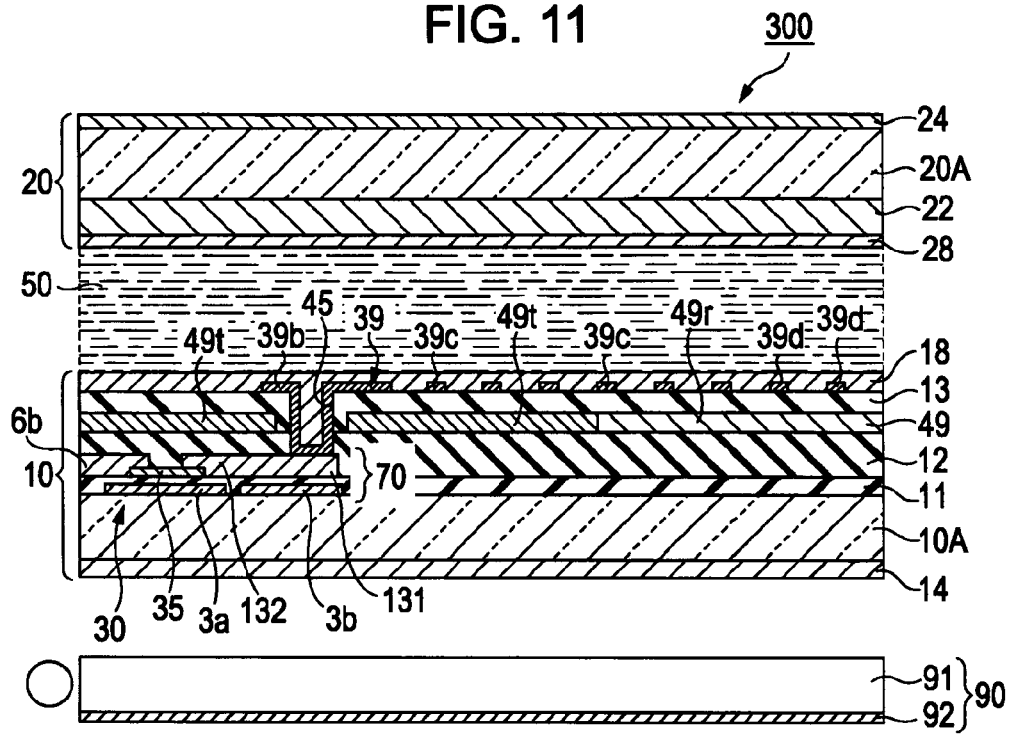
FIG. 11 is a structural cross-sectional view taken along the line XI-XI of FIG. 10A.

Referring to the sectional structure shown in FIG. 11, the TFT array substrate 10 and the counter substrate 20 are arranged to face each other with a liquid crystal layer 50 interposed therebetween. The TFT array substrate 10 has a substrate main body 10A as a base. On the inner surface of the substrate main body 10A (facing the liquid crystal layer 50), the scanning line 3a and the capacitor line 3b are formed, and a gate insulating film 11 is formed to cover the scanning line 3a and the capacitor line 3b.

On the gate insulating film 11, the semiconductor layer 35 formed of amorphous silicon is formed, and the source electrode 6b and the drain electrode 132 are provided to partially run onto the semiconductor layer 35. On the right side of the drain electrode 132 in the drawing, the capacitor electrode 131 is integrally formed. The semiconductor layer 35 is arranged to face the scanning line 3a through the gate insulating film 11, and the scanning line 3a in the opposing region constitutes the gate electrode of the TFT 30. The capacitor electrode 131 is arranged to face the capacitor line 3b through the gate insulating film 11, and the storage capacitor 70 is formed in a region where the capacitor electrode 131 overlaps the capacitor line 3b, with the gate insulating film 11 as a dielectric film.

A first interlayer insulating film 12 is formed to cover the semiconductor layer 35, the source electrode 6b, the drain electrode 132, and the capacitor electrode 131. On the first interlayer insulating film 12, the common electrode 49 which has the transparent common electrode 49t formed of a transparent conductive material such as ITO and so on and the reflective common electrode (reflecting layer) 49r primarily formed of a light-reflective metal film such as aluminum and so on is formed.

A second interlayer insulating film 13 formed of silicon oxide and so on is formed to cover the common electrode 49. On the second interlayer insulating film 13, the pixel electrode 39 formed of a transparent conductive material such as ITO and so on is formed. The pixel contact hole 45 is formed to pass through the first interlayer insulating film 12 and the second interlayer insulating film 13 and reach the capacitor electrode 131. A part of the contact portion 39b of the pixel electrode 39 is buried in the pixel contact hole 45, and the pixel electrode 39 and the capacitor electrode 131 are electrically connected. An opening is also provided in the common electrode 49 (transparent common electrode 49t) to correspond to the formation region of the pixel contact hole 45 such that the common electrode 49 does not come into contact with the pixel electrode 39. The alignment film 18 is formed to cover the region on the pixel electrode 39 and the second interlayer insulating film 13.

In the liquid crystal device 300 of this embodiment, like the liquid crystal device 100 of the above-described embodiment, a retardation film can be provided to correspond to the reflective display region R. Such a retardation film can be provided in a certain wiring layer between the reflective common electrode 49r and a substrate main body 20A of the counter substrate 20. For example, the retardation film may be provided on the surface of the reflective common electrode 49r or between the pixel electrode 39 and the second interlayer insulating film 13.

Referring to the optical axis arrangement shown in FIG. 10B, the transmission axes 153 and 155 of the polarizing plates 14 and 24 are arranged in parallel with the X-axis and Y-axis directions, respectively. The rubbing direction 151 of the alignment film, the transverse electric field direction 157 of the reflective display region, and the transverse electric field direction 158 of the transmissive display region T are the same as those in the first embodiment shown in FIG. 2B.

The operation of the liquid crystal device 300 having the above-described configuration is the same as that of the first embodiment described with reference to FIGS. 4A to 6, and thus the same advantages can be obtained. That is, the difference in display quality due to the optical path difference of display light between transmissive display and reflective display can be reduced by making the formation direction of the transverse electric field in the transmissive display region T and the reflective display region R different and making the alignment state of the liquid crystal molecules in both regions different. Therefore, it is possible to implement a liquid crystal device which obtains favorable display for reflective display and transmissive display, without using the multi-gap structure.

The liquid crystal device 300 of this embodiment is the FFS-mode liquid crystal device, and liquid crystal is driven by the electric field generated between the edge of the pixel electrode 39 and the common electrode 49. Accordingly, even when the reflective common electrode 49r serving as a reflecting layer is provided on the TFT array substrate 10, the transverse electric field to be applied to the liquid crystal layer 50 is not influenced. Therefore, since the TFT array substrate 10 is arranged close to the backlight 90 (on the rear surface as viewed from an observer), external light can be prevented from being incident on metal wiring lines such as the scanning line 3a or the data line 6a, the capacitor line 3b, and so on formed on the TFT array substrate 10. As a result, display visibility can be prevented from being degraded due to diffused reflection of external light by the metal wiring lines.

In this embodiment, the common electrode is formed by patterning for every one subpixel region. However, even when the common electrode is formed over a plurality of subpixel regions or a display region (including all subpixel regions), display can be performed.

Electronic Apparatus

Figure 12:
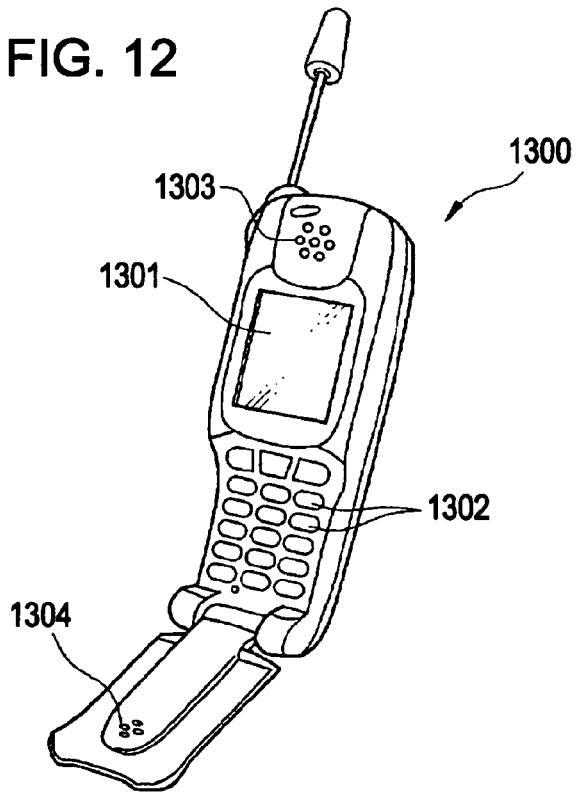
FIG. 12 is a structural perspective view showing an example of an electronic apparatus.

FIG. 12 is a structural perspective view of a cellular phone which is an example of an electronic apparatus having the liquid crystal device according to each embodiment of the invention as a display unit. The cellular phone 1300 has the liquid crystal device according to each embodiment of the invention as a small display unit 1301, a plurality of operating buttons 1302, a receiver 1303, and a transmitter 1304.

The liquid crystal device of each embodiment can be properly used as an image display unit of an electronic book, a personal computer, a digital still camera, a liquid crystal television, a viewfinder-type or monitor-direct-view-type video tape recorder, a car navigation device, a pager, an electronic organizer, an electronic calculator, a word processor, a work station, a video phone, a POS terminal, and an apparatus having a touch panel, in addition to the cellular phone. In any electronic apparatus, transmissive display and reflective display can be performed with high luminance, high contrast, and wide viewing angle.

The entire disclosure of Japanese Patent Application Nos: 2005-151889, filed May 25, 2005 and 2006-076305, filed Mar. 20, 2006 are expressly incorporated by reference herein.

What is claimed is:
1. A liquid crystal device comprising:
    first and second substrates which are arranged to face each other with a liquid crystal layer interposed therebetween; and
    first and second electrodes which are provided on the first substrate facing the liquid crystal layer,
    wherein the liquid crystal layer is driven by electric fields generated between the first and second electrodes, a reflective display region for reflective display and a transmissive display region for transmissive display are provided in each of a plurality of subpixel regions, and a main direction of an electric field generated between the first and second electrodes in the transmissive display region is different from a main direction of an electric field between the first and second electrodes in the reflective display region.

2. The liquid crystal device according to claim 1,
wherein each of the first and second electrodes has one or more strip electrodes, and
the one or more strip electrodes of the first electrode and the one or more strip electrodes of the second electrode are substantially arranged in parallel with each other in each of the transmissive display region and the reflective display region.

3. The liquid crystal device according to claim 2,
wherein an extension direction of the strip electrodes in the transmissive display region and an extension direction of the strip electrodes in the reflective display region are made different from each other.

4. The liquid crystal device according to claim 2,
wherein the strip electrodes have bent shapes in plan view in a planar region of the transmissive display region or the reflective display region and are arranged in parallel with one another, and
the bent portions of the strip electrodes are arranged along the initial alignment direction of the liquid crystal layer in the transmissive display region or the reflective display region.

5. The liquid crystal device according to claim 2,
wherein the strip electrodes having the bent shapes in plan view are provided in the transmissive display region, and the strip electrodes having substantially linear shapes are provided in the reflective display region.

6. The liquid crystal device according to claim 1,
wherein the first electrode has a plurality of strip electrodes, and is formed on the second electrode having a flat, substantially uniform shape through an insulating film, and
the plurality of strip electrodes are substantially arranged in parallel with one another in each of the transmissive display region and the reflective display region.

7. An electronic apparatus comprising the liquid crystal device according to claim 1.

8. A liquid crystal device comprising:
first and second substrates which are arranged to face each other with a liquid crystal layer interposed therebetween; and
first and second electrodes which are provided on the first substrate facing the liquid crystal layer,
wherein the liquid crystal layer is driven by electric fields generated between the first and second electrodes,
a reflective display region for reflective display and a transmissive display region for transmissive display are provided in each of a plurality of subpixel regions,
initial alignment states of liquid crystal molecules in the liquid crystal layer are uniform in the subpixel region, and
a maximum rotation angle of the liquid crystal molecules by the electric fields generated between the first and second electrodes is different between the transmissive display region and the reflective display region.

9. The liquid crystal device according to claim 8,
wherein the maximum rotation angle in the transmissive display region is larger than the maximum rotation angle in the reflective display region.

* * * * *

UNITED STATES PATENT AND TRADEMARK OFFICE
CERTIFICATE OF CORRECTION

PATENT NO. : 7,502,084 B2
APPLICATION NO. : 11/438156
DATED : March 10, 2009
INVENTOR(S) : Joji Nishimura It is certified that error appears in the above-identified patent and that said Letters Patent is hereby corrected as shown below:

On the Title Page

Please correct the Assignee as follows:

Item (73) Assignee: Epson Imaging Devices Corporation, Tokyo (JP)

Signed and Sealed this

Twentieth Day of April, 2010

David J. Kappos
*Director of the United States Patent and Trademark Office*